(12) United States Patent
Kray et al.

(10) Patent No.: US 11,834,960 B2
(45) Date of Patent: Dec. 5, 2023

(54) METHODS AND APPARATUS TO REDUCE DEFLECTION OF AN AIRFOIL

(71) Applicant: General Electric Company, Schenectady, NY (US)

(72) Inventors: Nicholas J. Kray, Evendale, OH (US); Gary W. Bryant, West Chester, OH (US); Nitesh Jain, Bengaluru (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/685,616

(22) Filed: Mar. 3, 2022

(65) Prior Publication Data

US 2023/0265760 A1 Aug. 24, 2023

(30) Foreign Application Priority Data

Feb. 18, 2022 (IN) .............................. 202211008587

(51) Int. Cl.
*F01D 25/04* (2006.01)
*F01D 5/16* (2006.01)
*F02C 7/00* (2006.01)
*F01D 25/06* (2006.01)
*F01D 5/26* (2006.01)

(52) U.S. Cl.
CPC ................ *F01D 5/16* (2013.01); *F01D 5/26* (2013.01); *F01D 25/04* (2013.01); *F01D 25/06* (2013.01); *F02C 7/00* (2013.01); *F05D 2220/32* (2013.01); *F05D 2260/96* (2013.01); *F05D 2300/603* (2013.01)

(58) Field of Classification Search
CPC ... F01D 5/16; F01D 5/26; F01D 25/04; F01D 25/06; F02C 7/00; F05D 2220/32; F05D 2260/96; F05D 2300/603
See application file for complete search history.

(56) References Cited

U.S. PATENT DOCUMENTS

| | | | | |
|---|---|---|---|---|
| 2,772,852 | A | * | 12/1956 | Stalker ...................... F01D 5/18 366/292 |
| 2,936,155 | A | | 5/1960 | Howell et al. |
| 2,948,506 | A | * | 8/1960 | Glasser ................. F01D 5/3046 416/500 |
| 3,027,138 | A | * | 3/1962 | Howell ..................... F01D 5/16 416/135 |
| 4,045,149 | A | * | 8/1977 | Ravenhall ............... F01D 5/282 416/135 |
| 4,492,521 | A | * | 1/1985 | Pask ..................... F01D 11/006 416/193 A |
| 4,541,778 | A | * | 9/1985 | Adams .................. F01D 11/008 416/193 A |

(Continued)

FOREIGN PATENT DOCUMENTS

WO WO-2020018090 A1 * 1/2020

*Primary Examiner* — David E Sosnowski
*Assistant Examiner* — Theodore C Ribadeneyra
(74) *Attorney, Agent, or Firm* — HANLEY, FLIGHT & ZIMMERMAN, LLC

(57) ABSTRACT

Methods and apparatus to reduce deflection of an airfoil are disclosed. An example apparatus disclosed herein includes a plate including an aperture, the airfoil disposed in the aperture, and a damper operatively coupled between the plate and a hub of the airfoil, the damper to transform flexural deflection of the airfoil to radial deflection of the plate.

17 Claims, 9 Drawing Sheets

(56) References Cited

U.S. PATENT DOCUMENTS

| | | | | |
|---|---|---|---|---|
| 4,917,574 A * | 4/1990 | Dodd | | F01D 5/16 |
| | | | | 416/193 A |
| 5,183,389 A * | 2/1993 | Gilchrist | | F01D 5/26 |
| | | | | 416/193 A |
| 5,399,069 A * | 3/1995 | Marey | | F01D 9/042 |
| | | | | 415/189 |
| 5,494,404 A * | 2/1996 | Furseth | | F01D 9/042 |
| | | | | 415/209.3 |
| 8,066,479 B2 | 11/2011 | El-Aini et al. | | |
| 8,684,695 B2 | 4/2014 | Walunj et al. | | |
| 8,910,947 B2 * | 12/2014 | Voisine | | F01D 5/005 |
| | | | | 29/889.21 |
| 10,012,085 B2 | 7/2018 | Hough et al. | | |
| 10,202,853 B2 | 2/2019 | Kleinow | | |
| 10,280,768 B2 * | 5/2019 | Freeman | | F01D 5/066 |
| 10,519,776 B2 | 12/2019 | Berdou et al. | | |
| 10,619,493 B2 | 4/2020 | De Gaillard et al. | | |
| 10,677,073 B2 | 6/2020 | Thistle et al. | | |
| 2004/0213672 A1 * | 10/2004 | Gautreau | | F01D 5/16 |
| | | | | 416/190 |
| 2010/0166545 A1 * | 7/2010 | Schuler | | F01D 9/041 |
| | | | | 415/189 |
| 2011/0038734 A1 * | 2/2011 | Marra | | F01D 5/147 |
| | | | | 416/204 A |
| 2012/0107125 A1 * | 5/2012 | Reghezza | | F01D 5/3007 |
| | | | | 416/248 |
| 2012/0328439 A1 * | 12/2012 | Quiroz-Hernandez | | |
| | | | | F02K 3/025 |
| | | | | 29/889.6 |
| 2013/0189092 A1 * | 7/2013 | Dube | | F01D 11/001 |
| | | | | 415/200 |
| 2018/0051579 A1 * | 2/2018 | Montgomery | | F01D 5/3023 |
| 2018/0119707 A1 * | 5/2018 | Murdock | | F04D 29/388 |
| 2018/0142558 A1 * | 5/2018 | Scharl | | F04D 29/668 |
| 2018/0230840 A1 * | 8/2018 | Amadon | | F01D 11/08 |
| 2019/0136696 A1 * | 5/2019 | Dietrich | | F01D 5/16 |
| 2019/0301288 A1 * | 10/2019 | Umehara | | F01D 5/16 |

\* cited by examiner

METHODS AND APPARATUS TO REDUCE DEFLECTION OF AN AIRFOIL

RELATED APPLICATION

This patent claims priority to Indian Patent Application No. 202211008587, which was filed on Feb. 18, 2022. Indian Patent Application No. 202211008587 is hereby incorporated herein by reference in its entirety. Priority to Indian Patent Application No. 202211008587 is hereby claimed.

FIELD OF THE DISCLOSURE

This disclosure relates generally to turbines and, more particularly, to methods and apparatus to reduce deflection of an airfoil.

BACKGROUND

A gas turbine engine generally includes, in serial flow order, an inlet section, a compressor section, a combustion section, a turbine section, and an exhaust section. In operation, air enters the inlet section and flows to the compressor section where one or more axial compressors progressively compress the air until it reaches the combustion section, thereby creating combustion gases. The combustion gases flow from the combustion section through a hot gas path defined within the turbine section and then exit the turbine section via the exhaust section.

Figure 1:
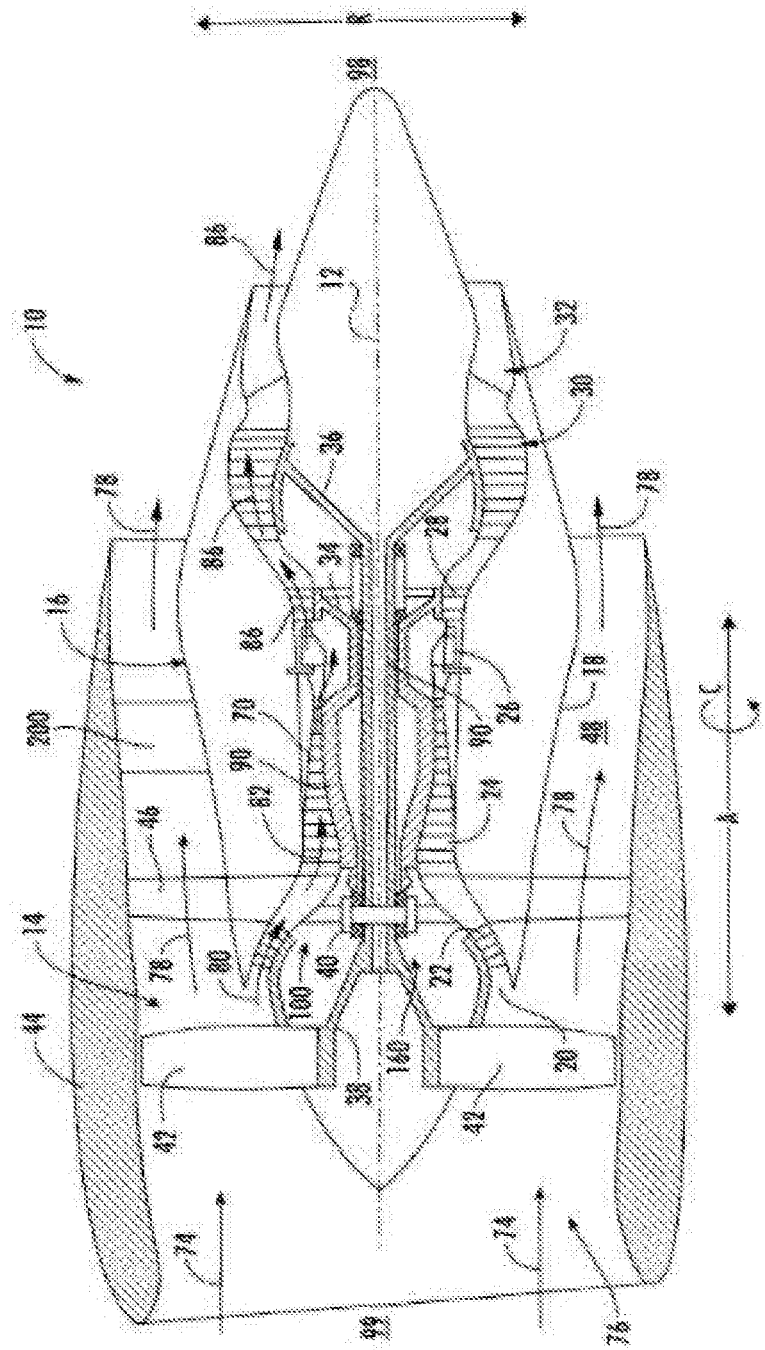
FIG. 1 is a cross-sectional view of an example turbofan gas turbine engine in which examples disclosed herein may be implemented.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

DETAILED DESCRIPTION

Aircrafts include engines that act as a propulsion system to generate mechanical power and forces such as thrust. A gas turbine, also called a combustion turbine or a turbine engine, is a type of internal combustion engine that can be implemented in the propulsion system of an aircraft. For example, a gas turbine can be implemented in connection with a turbofan or a turbojet aircraft engine. Gas turbines also have significant applications in areas such as industrial power generation.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe example implementations and not to be taken limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object.

The terms "upstream" and "downstream" refer to the relative direction with respect to fluid flow in a fluid pathway. For example, "upstream" refers to the direction from which the fluid flows, and "downstream" refers to the direction to which the fluid flows. As used herein, "vertical" refers to the direction perpendicular to the ground. As used herein, "horizontal" refers to the direction parallel to the centerline of a gas turbine engine. As used herein, "lateral" refers to the direction perpendicular to the axial and vertical directions (e.g., into and out of the plane of FIGS. 1 and/or 2, etc.).

In some examples used herein, the term "substantially" is used to describe a relationship between two parts that is within three degrees of the stated relationship (e.g., a substantially collinear relationship is within three degrees of being linear, a substantially perpendicular relationship is within three degrees of being perpendicular, a substantially parallel relationship is within three degrees of being parallel, etc.).

As used herein, the terms "axial" and "longitudinal" both refer to a direction parallel to the centerline axis of a gas turbine (e.g., a turbofan, a core gas turbine engine, etc.), while "radial" refers to a direction perpendicular to the axial direction, and "tangential" or "circumferential" refers to a direction mutually perpendicular to the axial and radial directions. Accordingly, as used herein, "radially inward" refers to the radial direction from the outer circumference of the gas turbine towards the centerline axis of the gas turbine, and "radially outward" refers to the radial direction from the centerline axis of the gas turbine towards the outer circumference of gas turbine. As used herein, the terms "forward", "fore", and "front" refer to a location relatively upstream in an air flow passing through or around a component, and the terms "aft" and "rear" refer to a location relatively downstream in an air flow passing through or around a component.

The basic operation of a gas turbine implemented in connection with a turbofan engine of a propulsion system of an aircraft includes an intake of fresh atmospheric air flow through the front of the turbofan engine with a fan. In the operation of a turbofan engine, a first portion of the intake air bypasses a core gas turbine engine of the turbofan to produce thrust directly. A second portion of the intake air travels through a booster compressor (e.g., a first compressor) located between the fan and a high-pressure compressor (e.g., a second compressor) in the core gas turbine engine (e.g., the gas turbine). The booster compressor is used to raise or boost the pressure of the second portion of the intake air prior to the air flow entering the high-pressure compressor. The air flow can then travel through the high-pressure compressor that further pressurizes the air flow. The booster compressor and the high-pressure compressor each include a group of blades attached to a rotor and/or shaft. The blades spin at high speed relative to stationary vanes and each rotation of the blades subsequently compresses the air flow. The high-pressure compressor then feeds the pressurized air flow to a combustion chamber (e.g., combustor). In some examples, the high-pressure compressor feeds the pressurized air flow at speeds of hundreds of miles per hour. In some instances, the combustion chamber includes one or more rings of fuel injectors that inject a steady stream of fuel into the combustion chamber, where the fuel mixes with the pressurized air flow. A secondary use of the compressors, particularly the high-pressure compressor, is to bleed air for use in other systems of the aircraft (e.g., cabin pressure, heating, and air conditioning, etc.)

In the combustion chamber of the core gas turbine engine, the fuel is ignited with an electric spark provided by an igniter, where the fuel in some examples burns at temperatures of more than 2000 degrees Fahrenheit. The resulting combustion produces a high-temperature, high-pressure gas stream (e.g., hot combustion gas) that passes through another group of blades called a turbine. The turbine can include a low-pressure turbine and a high-pressure turbine, for example. Each of the low-pressure turbine and the high-pressure turbine includes an intricate array of alternating rotating blades and stationary airfoil-section blades (e.g., vanes). The high-pressure turbine is located axially downstream from the combustor and axially upstream from the low-pressure turbine. As the hot combustion gas passes through the turbine, the hot combustion gas expands through the blades and/or vanes, causing the rotating blades coupled to rotors of the high-pressure turbine and the low-pressure turbine to spin.

The rotating blades of the high-pressure turbine and the low-pressure turbine serve at least two purposes. A first purpose of the rotating blades is to drive the fan, the high-pressure compressor, and/or the booster compressor to draw more pressured air into the combustion chamber. For example, in a dual-spool design of a turbofan, the low-pressure turbine (e.g., a first turbine) can be attached to and in force transmitting connection with the booster compressor (e.g., the first compressor) and fan via a first shaft, collectively a first spool of the gas turbine, such that the rotation of a rotor of the low-pressure turbine drives a rotor of the booster compressor and the fan. For example, a high-pressure turbine (e.g., a second turbine) can be attached to and in force transmitting connection with the high-pressure compressor (e.g., a second compressor) via a second shaft coaxial with the first shaft, collectively a second spool of the gas turbine, such that the rotation of a rotor of the high-pressure turbine drives a rotor of the high-pressure compressor. A second purpose of the rotating blades is to spin a generator operatively coupled to the turbine section to produce electricity. For example, the turbine can generate electricity to be used by an aircraft, a power station, etc.

It is generally an object of the design of aircraft engines such as turbofans to compress as much air as is feasible within the compressor of the core gas turbine engine given the static, dynamic, centrifugal and/or thermal stress limitations and weight considerations of aspects of the core gas turbine engine and/or the turbofan engine. A metric defining the compressive action of a compressor is a compression ratio (e.g., pressure ratio) of a compressor. The compression ratio of a compressor of a turbofan engine is the ratio of pressure at an outlet of the compressor (e.g., the outlet of the high-pressure compressor at the combustion chamber of the gas turbine) to pressure at an inlet of a fan. A higher compression ratio increases a thermal efficiency of the turbine engine and decreases a specific fuel consumption of the turbine engine (e.g., a ratio of air to fuel used to create thrust produced by the jet engine). Thus, an increase in the compression ratio of the compressor of a gas turbine can increase thrust produced by a jet engine, such as a turbofan, etc., and/or can increase fuel efficiency of the jet engine. In turn, it is an object of gas turbine design to minimize or otherwise reduce pressure losses through the compressors to maximize or otherwise improve the compression ratio. Though examples disclosed herein are discussed in connection with a turbofan jet engine, it is understood that examples disclosed herein can be implemented in connection with a turbojet jet engine, a turboprop jet engine, a combustion turbine for power production, or any other suitable application where it is desired to increase compression ratios across one or more compressors.

The example low-pressure compressor and high-pressure compressor of the turbine engine of the turbofan each include one or more stages. Each stage includes an annular array of compressor blades (e.g., first airfoils) mounted about a central rotor paired with an annular array of stationary compressor vanes (e.g., second airfoils) spaced apart from the rotor and fixed to a casing of the compressor. At an aft portion of a compressor stage, rotation of the rotor and accompanying blades provides an increase in velocity, temperature, and pressure of air flow. At a fore portion of the compressor stage, the air flow diffuses (e.g., loses velocity) across compressor vanes providing for an increase in pressure. The implementation of multiple stages across the low-pressure compressor and high-pressure compressor provides for the compression ratios to operate a jet engine such as a turbofan.

In the example of the high-pressure compressor and the low-pressure compressor, compressor blades (also referred to herein as blades and/or dovetail blades) are arrayed about a corresponding high-pressure compressor rotor and low-pressure compressor rotor, respectively. The high-pressure rotor and accompanying compressor blades (e.g., blades, dovetail blades, etc.) can be fashioned from titanium alloys (e.g., a titanium-aluminum alloy, a titanium-chromium alloy, etc.) and/or steel alloys (e.g., a steel-chromium alloy), etc. For example, to increase ease of maintenance and assembly, replaceability of blades, and/or modularity of the high-pressure compressor, discrete compressor blades are mounted in series annularly about the high-pressure rotor to achieve a substantially uniform distribution annularly about the rotor. For this purpose, an example compressor blade implemented in accordance with the teachings of this disclosure includes an airfoil portion and a mounting portion (e.g., a root). The airfoil portion of the compressor blade causes the velocity, pressure, and temperature increase to the air flow. The mounting portion of the compressor blade enables mounting of blade to the rotor. In some examples, the geometry of the airfoil portion and/or mounting portion can be different for the compressor blades of each stage of the high-pressure compressor and the same for the compressor blades within each stage of the high-pressure compressor.

In some propeller or open-rotor engine applications, a high vibratory load is experienced during various phases of the flight due to asymmetric propeller loading (e.g., P-Factor or 1P loading). 1P loading, also referred to as +/−1P loading, is typically highest at takeoff, but also may occur at any point at which the airflow is not oriented normal to the engine. Certain examples address +/−1P loading by applying a radial preload to the blade assembly that provides better blade retention and allows for better serviceability. In some cases, the vibratory loads experienced by an airfoil during operation of the engine may result in deflection of the airfoil. Such deflection produces a moment on the root of the blade and, in some cases, may result in wear and/or failure of the blade. In some cases, when there is failure of a blade, a complex disassembly process must be completed to remove the blade, which increases the time and work required to service the equipment.

Examples disclosed herein reduce deflection of an airfoil during operation of a gas turbine engine. An example deflection reduction mechanism disclosed herein includes an example plate including an example aperture. The airfoil is disposed in the aperture, and an example damper is operatively coupled between the plate and a hub of the airfoil. In some examples, when vibratory loads applied to the airfoil result in flexural deflection of the airfoil, the damper opposes a direction of the vibratory loads to transform the flexural deflection of the airfoil to radial deflection of the plate, thereby biasing the airfoil to an undeflected position. In some examples, the damper includes one or more springs, one or more spring washers, and/or one or more rubber feet spaced about a circumference of the blade. Advantageously, by reducing defection of airfoils, examples disclosed herein reduce and/or prevent damage to and/or failure of the airfoils, thus reducing the time, work, and part costs required for repair and/or replacement of the airfoils.

Example deflection reduction mechanisms disclosed herein can be applied to both closed and open rotor engine designs. For purposes of illustration only, FIG. 1 illustrates an example closed-rotor turbofan engine, and FIG. 2 illustrates an example open-rotor engine.

Figure 2:
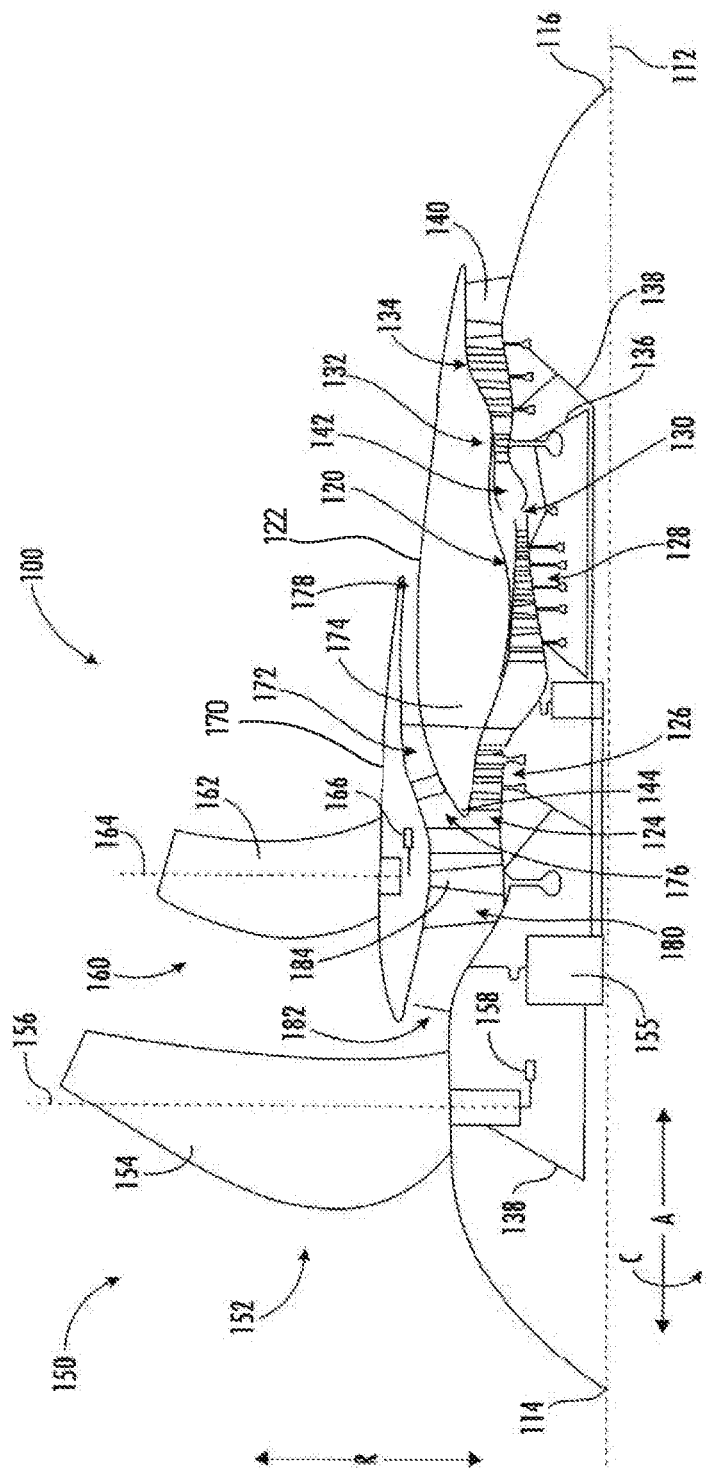
FIG. 2 is a cross-sectional view of an example open rotor engine in which examples disclosed herein may be implemented.

FIG. 1 is a cross-sectional view of a turbofan gas turbine engine in which examples disclosed herein may be implemented. Referring now to the drawings, FIG. 1 is a schematic partially cross-sectioned side view of an exemplary gas turbine engine 10 as may incorporate various examples of the preferred embodiments. The engine 10 may particularly be configured as a gas turbine engine for an aircraft. Although further described herein as a turbofan engine, the engine 10 may define a turboshaft, turboprop, or turbojet gas turbine engine, including marine and industrial engines and auxiliary power units. As shown in FIG. 1, the engine 10 has a longitudinal or axial centerline axis 12 that extends therethrough for reference purposes. An axial direction A is extended co-directional to the axial centerline axis 12 for reference. The engine 10 further defines an upstream end 99 and a downstream end 98 for reference. In general, the engine 10 may include a fan assembly 14 and a core engine 16 disposed downstream from the fan assembly 14. For reference, the engine 10 defines an axial direction A, a radial direction R, and a circumferential direction C. In general, the axial direction A extends parallel to the axial centerline 12, the radial direction R extends outward from and inward to the axial centerline 12 in a direction orthogonal to the axial direction A, and the circumferential direction extends three hundred sixty degrees (360°) around the axial centerline 12.

The core engine 16 may generally include a substantially tubular outer casing 18 that defines an annular inlet 20. The outer casing 18 encases or at least partially forms, in serial flow relationship, a compressor section having a booster or low pressure (LP) compressor 22, a high pressure (HP) compressor 24, a heat addition system 26, an expansion section or turbine section including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In certain examples, as shown in FIG. 1, the LP rotor shaft 36 may be connected to the fan shaft 38 via a reduction gear 40 such as in an indirect-drive or geared-drive configuration.

As shown in FIG. 1, the fan assembly 14 includes a plurality of fan blades 42 that are coupled to and that extend radially outwardly from the fan shaft 38. An annular fan casing or nacelle 44 circumferentially may surround the fan assembly 14 and/or at least a portion of the core engine 16. It should be appreciated by those of ordinary skill in the art that the nacelle 44 may be configured to be supported relative to the core engine 16 by a plurality of circumferentially-spaced outlet guide vanes or struts 46. Moreover, at least a portion of the nacelle 44 may extend over an outer portion of the core engine 16 so as to define a fan flow passage 48 therebetween. However, it should be appreciated that various configurations of the engine 10 may omit the nacelle 44, or omit the nacelle 44 from extending around the fan blades 42, such as to provide an open rotor or propfan configuration of the engine 10 depicted in FIG. 2.

It should be appreciated that combinations of the shafts 34, 36, the compressors 22, 24, and the turbines 28, 30 define a rotor assembly 90 of the engine 10. For example, the HP rotor shaft 34, HP compressor 24, and HP turbine 28 may define a high speed or HP rotor assembly of the engine 10. Similarly, combinations of the LP rotor shaft 36, LP compressor 22, and LP turbine 30 may define a low speed or LP rotor assembly of the engine 10. Various examples of the engine 10 may further include the fan shaft 38 and fan blades 42 as the LP rotor assembly. In certain examples, the engine 10 may further define a fan rotor assembly at least partially mechanically de-coupled from the LP spool via the fan shaft 38 and the reduction gear 40. Still further examples may further define one or more intermediate rotor assemblies defined by an intermediate pressure compressor, an intermediate pressure shaft, and an intermediate pressure turbine disposed between the LP rotor assembly and the HP rotor assembly (relative to serial aerodynamic flow arrangement).

During operation of the engine 10, a flow of air, shown schematically by arrows 74, enters an inlet 76 of the engine 10 defined by the fan case or nacelle 44. A portion of air, shown schematically by arrow 80, enters the core engine 16 through an annular inlet 20 defined at least partially via the outer casing 18. The flow of air is provided in serial flow through the compressors 22, 24, the heat addition system 26, and the expansion section via a core flowpath 70. The flow of air 80 is increasingly compressed as it flows across successive stages of the compressors 22, 24, such as shown schematically by arrows 82. The compressed air 82 enters the heat addition system 26 and mixes with a liquid and/or gaseous fuel and is ignited to produce combustion gases 86. It should be appreciated that the heat addition system 26 may form any appropriate system for generating combustion gases, including, but not limited to, deflagrative or detonative combustion systems, or combinations thereof. The heat addition system 26 may include annular, can, can-annular, trapped vortex, involute or scroll, rich burn, lean burn, rotating detonation, or pulse detonation configurations, or combinations thereof.

The combustion gases 86 release energy to drive rotation of the HP rotor assembly and the LP rotor assembly before exhausting from the jet exhaust nozzle section 32. The release of energy from the combustion gases 86 further drives rotation of the fan assembly 14, including the fan blades 42. A portion of the air 74 bypasses the core engine 16 and flows across the fan flow passage 48, such as shown schematically by arrows 78.

It should be appreciated that FIG. 1 depicts and describes a two-stream engine having the fan flow passage 48 and the core flowpath 70. The example depicted in FIG. 1 has a nacelle 44 surrounding the fan blades 42, such as to provide noise attenuation, blade-out protection, and other benefits known for nacelles, and which may be referred to herein as a "ducted fan," or the entire engine 10 may be referred to as a "ducted engine."

FIG. 2 is a schematic cross-sectional view of an example open-rotor turbine engine according to one example of the present disclosure. Particularly, FIG. 2 illustrates an aviation three-stream turbofan engine herein referred to as "three-stream engine 100". The three-stream engine 100 of FIG. 2 can be mounted to an aerial vehicle, such as a fixed-wing aircraft, and can produce thrust for propulsion of the aerial vehicle. The architecture of the three-stream engine 100 provides three distinct streams of thrust-producing airflow during operation. Unlike the engine 10 shown in FIG. 1, the three-stream engine 100 includes a fan that is not ducted by a nacelle or cowl, such that it may be referred to herein as an "unducted fan," or the entire engine 100 may be referred to as an "unducted engine."

For reference, the three-stream engine 100 defines an axial direction A, a radial direction R, and a circumferential direction C. Moreover, the three-stream engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The three-stream engine 100 extends between a forward end 114 and an aft end 116, e.g., along the axial direction A.

The three-stream engine 100 includes a core engine 120 and a fan section 150 positioned upstream thereof. Generally, the core engine 120 includes, in serial flow order, a compressor section, a combustion section, a turbine section, and an exhaust section. Particularly, as shown in FIG. 2, the core engine 120 includes a core cowl 122 that defines an annular core inlet 124. The core cowl 122 further encloses a low pressure system and a high pressure system. In certain examples, the core cowl 122 may enclose and support a booster or low pressure ("LP") compressor 126 for pressurizing the air that enters the core engine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 where fuel is injected into the pressurized air stream and ignited to raise the temperature and energy level of the pressurized air. It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to a high pressure turbine 132. The high pressure turbine 132 drives the high pressure compressor 128 through a high pressure shaft 136. In this regard, the high pressure turbine 132 is drivingly coupled with the high pressure compressor 128. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 is coaxial with the HP shaft 136 in this example. After driving each of the turbines 132, 134, the combustion products exit the core engine 120 through a core exhaust nozzle 140 to produce propulsive thrust. Accordingly, the core engine 120 defines a core flowpath or core duct 142 that extends between the core inlet 124 and the core exhaust nozzle 140. The core duct 142 is an annular duct positioned generally inward of the core cowl 122 along the radial direction R.

The fan section 150 includes a fan 152, which is the primary fan in this example. For the depicted example of FIG. 2, the fan 152 is an open rotor or unducted fan. However, in other examples, the fan 152 may be ducted, e.g., by a fan casing or nacelle circumferentially surrounding the fan 152. As depicted, the fan 152 includes an array of fan blades 154 (only one shown in FIG. 2). The fan blades 154 are rotatable, e.g., about the longitudinal axis 112. As noted above, the fan 152 is drivingly coupled with the low pressure turbine 134 via the LP shaft 138. The fan 152 can be directly coupled with the LP shaft 138, e.g., in a direct-drive configuration. Optionally, as shown in FIG. 2, the fan 152 can be coupled with the LP shaft 138 via a speed reduction gearbox 155, e.g., in an indirect-drive or geared-drive configuration.

Moreover, the fan blades 154 can be arranged in equal spacing around the longitudinal axis 112. Each blade 154 has a root and a tip and a span defined therebetween. Each blade 154 defines a central blade axis 156. For this example, each blade 154 of the fan 152 is rotatable about its respective central blade axis 156, e.g., in unison with one another. One or more actuators 158 can be controlled to pitch the blades 154 about their respective central blade axis 156. However, in other examples, each blade 154 may be fixed or unable to be pitched about its central blade axis 156.

The fan section 150 further includes a fan outlet guide vane array 160 that includes fan outlet guide vanes 162 (only one shown in FIG. 2) disposed around the longitudinal axis 112. For this example, the fan outlet guide vanes 162 are not rotatable about the longitudinal axis 112. Each fan outlet guide vane 162 has a root and a tip and a span defined therebetween. The fan outlet guide vanes 162 may be unshrouded as shown in FIG. 2 or may be shrouded, e.g., by an annular shroud spaced outward from the tips of the fan outlet guide vanes 162 along the radial direction R. Each fan outlet guide vane 162 defines a central blade axis 164. For this example, each fan outlet guide vane 162 of the fan outlet guide vane array 160 is rotatable about its respective central blade axis 164, e.g., in unison with one another. One or more actuators 166 can be controlled to pitch the fan outlet guide vane 162 about their respective central blade axis 164. However, in other examples, each fan outlet guide vane 162 may be fixed or unable to be pitched about its central blade axis 164. The fan outlet guide vanes 162 are mounted to a fan cowl 170.

As shown in FIG. 2, in addition to the fan 152, which is unducted, a ducted fan 184 is included aft of the fan 152, such that the three-stream engine 100 includes both a ducted and an unducted fan that both serve to generate thrust through the movement of air without passage through core engine 120. The ducted fan 184 is shown at about the same axial location as the fan outlet guide vane 162, and radially inward of the fan outlet guide vane 162. Alternatively, the ducted fan 184 may be between the fan outlet guide vane 162 and core duct 142, or be farther forward of the fan outlet guide vane 162. The ducted fan 184 may be driven by the low pressure turbine 134 (e.g., coupled to the LP shaft 138), or by any other suitable source of rotation, and may serve as the first stage of booster or may be operated separately.

The fan cowl 170 annularly encases at least a portion of the core cowl 122 and is generally positioned outward of the core cowl 122 along the radial direction R. Particularly, a downstream section of the fan cowl 170 extends over a forward portion of the core cowl 122 to define a fan flowpath or fan duct 172. Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The stationary struts 174 may each be aerodynamically contoured to direct air flowing thereby. Other struts in addition to the stationary struts 174 may be used to connect and support the fan cowl 170 and/or core cowl 122. In many examples, the fan duct 172 and the core cowl 122 may at least partially co-extend (generally axially) on opposite sides (e.g., opposite radial sides) of the core cowl 122. For example, the fan duct 172 and the core cowl 122 may each extend directly from the leading edge 144 of the core cowl 122 and may partially co-extend generally axially on opposite radial sides of the core cowl 122.

The three-stream engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the array of fan outlet guide vanes 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a splitter or leading edge 144 of the core cowl 122. The inlet duct 180 is wider than the core duct 142 along the radial direction R. The inlet duct 180 is also wider than the fan duct 172 along the radial direction R.

Figure 3:
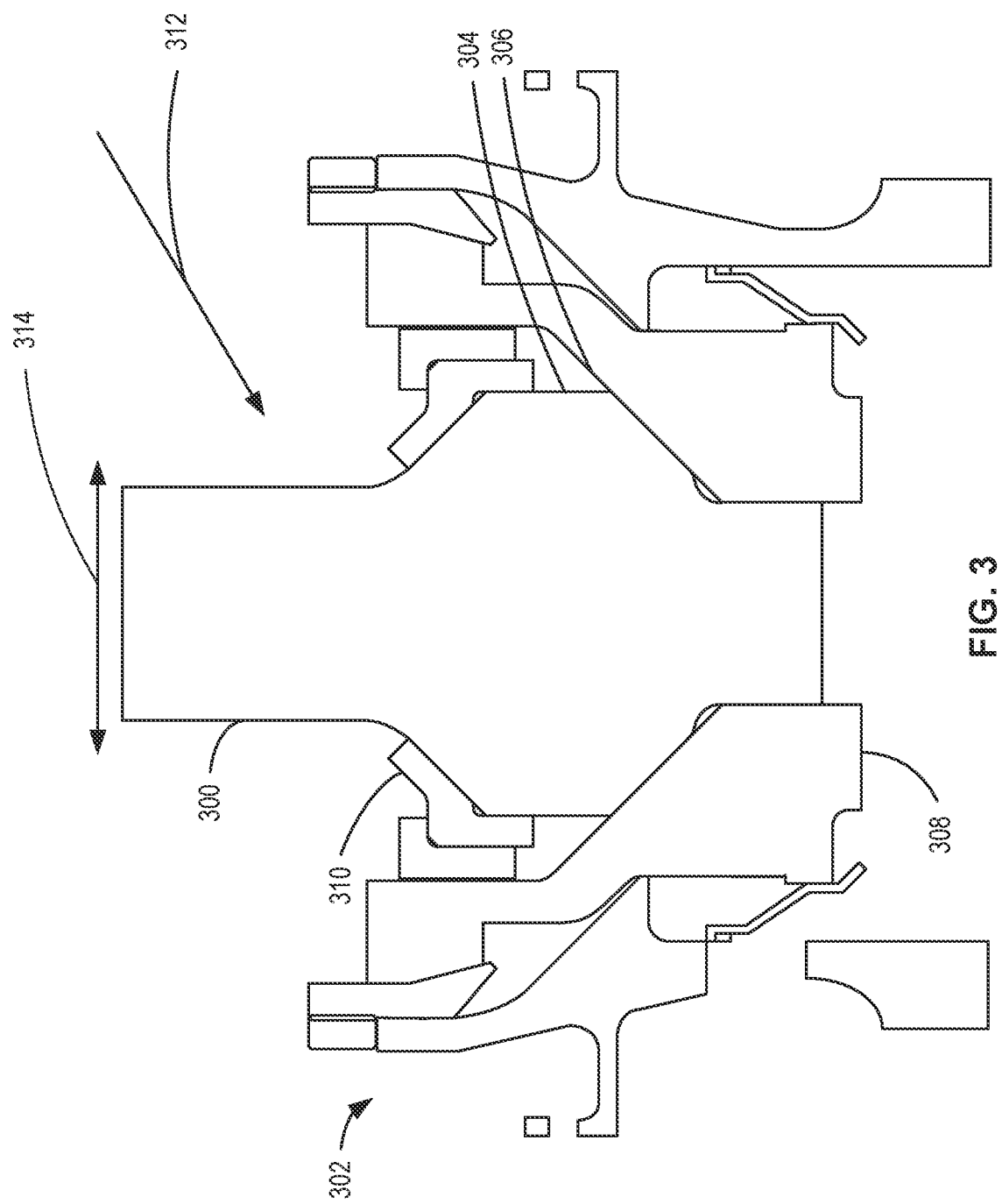
FIG. 3 is a cross-sectional view of an example airfoil coupled to an example hub and bearing assembly.

FIG. 3 is a cross-sectional view of an example airfoil 300 coupled to an example hub and bearing assembly (e.g., rotor hub) 302. In some examples, the airfoil 300 may correspond to one of the blades 154 of FIG. 2. In the illustrated example of FIG. 3, the airfoil 300 includes an example root 304 disposed in an example cavity (e.g., socket) 306 of the hub and bearing assembly 302. In this example, the hub and bearing assembly 302 includes an example trunnion 308 and an example split collet 310, where the split collet 310 is to prevent removal of the airfoil 300 from the cavity 306. In some examples, the airfoil 300 is at least one of a metal, a composite material, or a combination of the metal and the composite material.

In some examples, the airfoil 300 is implemented on an open rotor engine, such as the open rotor engine 100 of FIG. 2. As such, the open rotor engine 100 does not include a fan casing (e.g., the nacelle 44 of FIG. 1) to direct a flow of air therethrough. In such examples, air may enter the open rotor engine from multiple angles and generate example vibratory (1P) loads 312 on the airfoil 300. In some examples, the vibratory loads 312 can cause flexural deflection of the airfoil 300 in an example tangential direction 314. Such flexural deflection can produce a moment at the root 304, resulting in wear and, in some cases, fracture of the airfoil 300.

Figure 4:
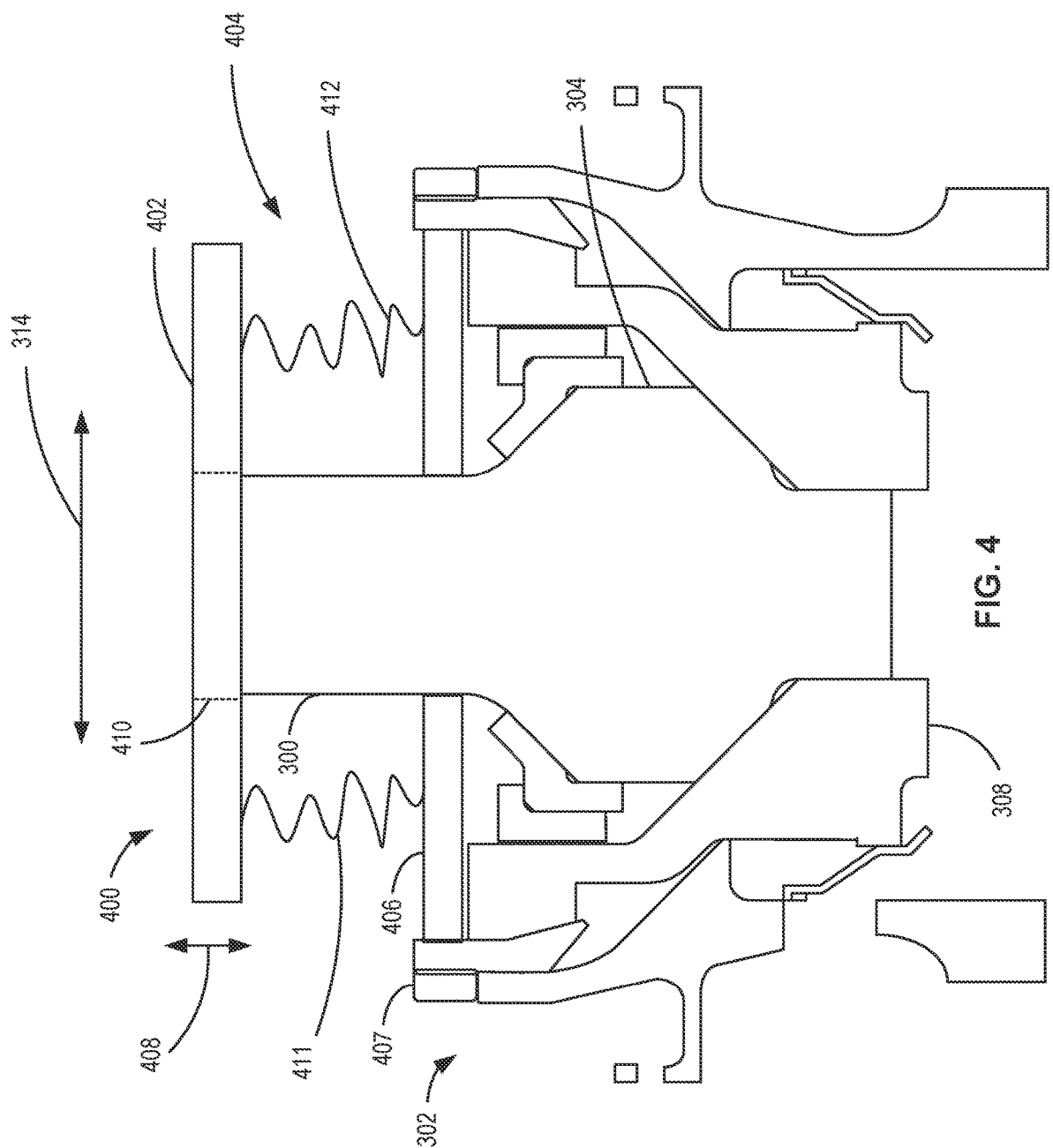
FIG. 4 illustrates a first configuration of an example deflection reduction mechanism in accordance with teachings of this disclosure implemented on the example airfoil of FIG. 3.

FIG. 4 illustrates an example deflection reduction mechanism 400 in accordance with teachings of this disclosure implemented on the example airfoil 300 of FIG. 3. In examples disclosed herein, the deflection reduction mechanism 400 is configured to reduce flexural deflection of the airfoil 300. In the illustrated example of FIG. 4, the deflection reduction mechanism 400 includes an example plate (e.g., damper plate) 402 and an example damper 404. In this example, the hub and bearing assembly 302 further includes an example retention device (e.g., retention ring) 406 coupled to the trunnion 308 and spaced about a circumference of the airfoil 300. In this example, the damper 404 is operatively coupled between the plate 402 and the retention device 406. In some examples, the damper 404 is coupled to one or more different components of the hub and bearing assembly 302 in addition to or instead of the retention device 406. For example. the damper 404 can be operatively coupled to an example outer trunnion wall 407 of the hub and bearing assembly 302 instead of the retention device 406. In the illustrated example, the airfoil 300 is shown in a starting position (e.g., undeflected position) in which the airfoil 300 is substantially aligned with an example radial direction 408.

In the illustrated example of FIG. 4, the plate 402 includes an example aperture 410. In this example, the aperture 410 is centrally positioned in the plate 402 and the airfoil 300 is disposed in the aperture 410. In other examples, the plate 402 is integral to the airfoil 300, such that the plate 402 and the airfoil 300 are manufactured as one part. In some examples, the plate 402 is welded to the airfoil 300. However, other constructions and/or methods can be used to couple the plate 402 to the airfoil 300. In some other examples, the plate 402 is separate from the airfoil 300, where a gap (e.g., clearance gap) between the plate 402 and the airfoil 300 in the starting position is less than a threshold (e.g., 1 mm). In some such examples, the airfoil 300 contacts an edge of the aperture 410 of the plate 402 when the flexural deflection of the airfoil 300 is greater than the threshold. As such, the deflection reduction mechanism 400 does not reduce the flexural deflection of the airfoil 300 when the flexural deflection is less than the threshold.

In examples disclosed herein, the damper 404 provides damping behavior during engine operation. For example, the damper 404 absorbs energy (e.g., vibrational energy) during engine operation and act anti-mode to certain vibration responses. That is, the airfoil 300 vibrates at a first frequency during normal engine operation based on the design parameters of the airfoil 300 (e.g., durability, stiffness, etc.). The damper 404 can be tuned (e.g., designed to have a certain durability, stiffness, weight, etc.) to vibrate at a second frequency during normal engine operation such that the second frequency interferes with the first frequency. That is, the damper 404 can be tuned to act anti-mode to the vibration of the gas turbine engine 100. For example, the gas turbine engine 100 may vibrate at a first frequency of 10 Hz. The damper 404 can be tuned to vibrate at a second frequency that is non-integral to the system response, such as 13 Hz or 14 Hz. The vibration of the damper 404 interferes with the vibration of the airfoil 300, and, thus, dampens the vibration of the airfoil 300.

In the illustrated example of FIG. 4, the damper 404 is operatively coupled between the plate 402 and the retention device 406 to transform flexural deflection caused by vibration of the airfoil 300 to radial deflection (e.g., in the radial direction 408) of the plate 402. In this example, the damper 404 includes example first and second springs 411, 412 coupled between the plate 402 and the retention device 406. In examples disclosed herein, the springs 411, 412 are bolted, brazed, and/or otherwise retained to the plate 402 and the retention device 406. While two of the springs 411, 412 are shown in this example, the damper 404 can include a different number of the springs 411, 412 spaced about a circumference of the root 304.

In the illustrated example of FIG. 4, when the vibratory load 312 of FIG. 3 is applied to the airfoil 300 (e.g., during operation of the open rotor engine 100 of FIG. 2), a component of the vibratory load 312 may cause deflection of the airfoil 300 in the tangential direction 314. In some examples, when such deflection of the airfoil 300 occurs, the airfoil 300 causes the plate 402 to move in the radial direction 408 and, thus, causes the springs 411, 412 to extend and/or compress. The springs 411, 412 apply forces on the plate 402 that counteract the direction of motion of the plate 402 and dissipate vibrational energy from the vibratory load 312. As such, the springs 411, 412 bias the plate 402 and, thus, the airfoil 300, to the starting (e.g., undeflected) position.

In some examples, the deflection reduction mechanism 400 includes means for providing an aperture. For example, the means for providing an aperture may be implemented by the plate 402. In some examples, the deflection reduction mechanism 400 includes means for damping. For example, the means for damping may be implemented by the damper 404.

Figure 5:
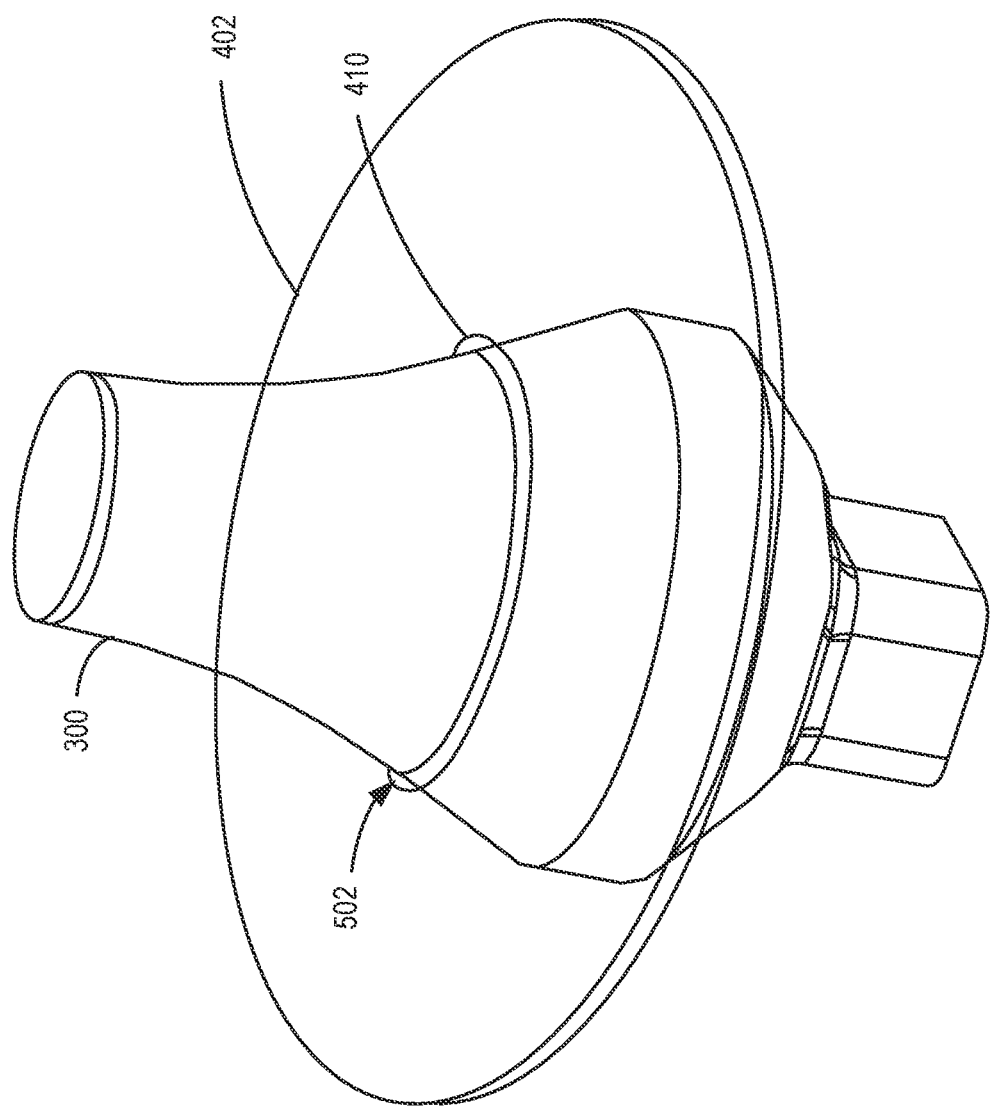
FIG. 5 is a top view of the example airfoil and the example plate of the deflection reduction mechanism of FIG. 4.

FIG. 5 is a top view of the example airfoil 300 and the example plate 402 of FIG. 4. In the illustrated example of FIG. 5, the plate 402 is separate from the airfoil 300 such that an example gap (e.g., clearance gap) 502 is provided between the airfoil 300 and an edge of the aperture 410. In this example, a width of the gap 502 is less than a threshold of 1 millimeter. In other examples, the threshold can be different. In examples disclosed herein, the gap 502 allows small deflections (e.g., less than the threshold) of the airfoil 300 to occur without engagement of the deflection reduction mechanism 400 of FIG. 4. However, when the deflection of the airfoil 300 is greater than the threshold, the airfoil 300 contacts the plate 402 to cause deflection and/or otherwise movement thereof. Accordingly, in such examples, the deflection reduction mechanism 400 reduces deflections of the airfoil 300 when the deflections are relatively large (e.g., greater than the threshold).

In the illustrated example of FIG. 5, the plate 402 and the aperture 410 are generally circular and correspond to a cross-sectional shape of the airfoil 300. In other examples, a different shape of the plate 402 and/or the aperture 410 may be used instead. For example, at least one of the plate 402 or the aperture 410 can be elliptical, rectangular, hexagonal, etc. In examples disclosed herein, the plate 402 is a composite metal material. However, in other examples, a material of the plate 402 may be different. For example, the plate 402 can be a composite material, a metal, or a combination of the composite material and the metal. In some examples, the plate 402 and the airfoil 300 can include similar and/or different materials.

Figure 6:
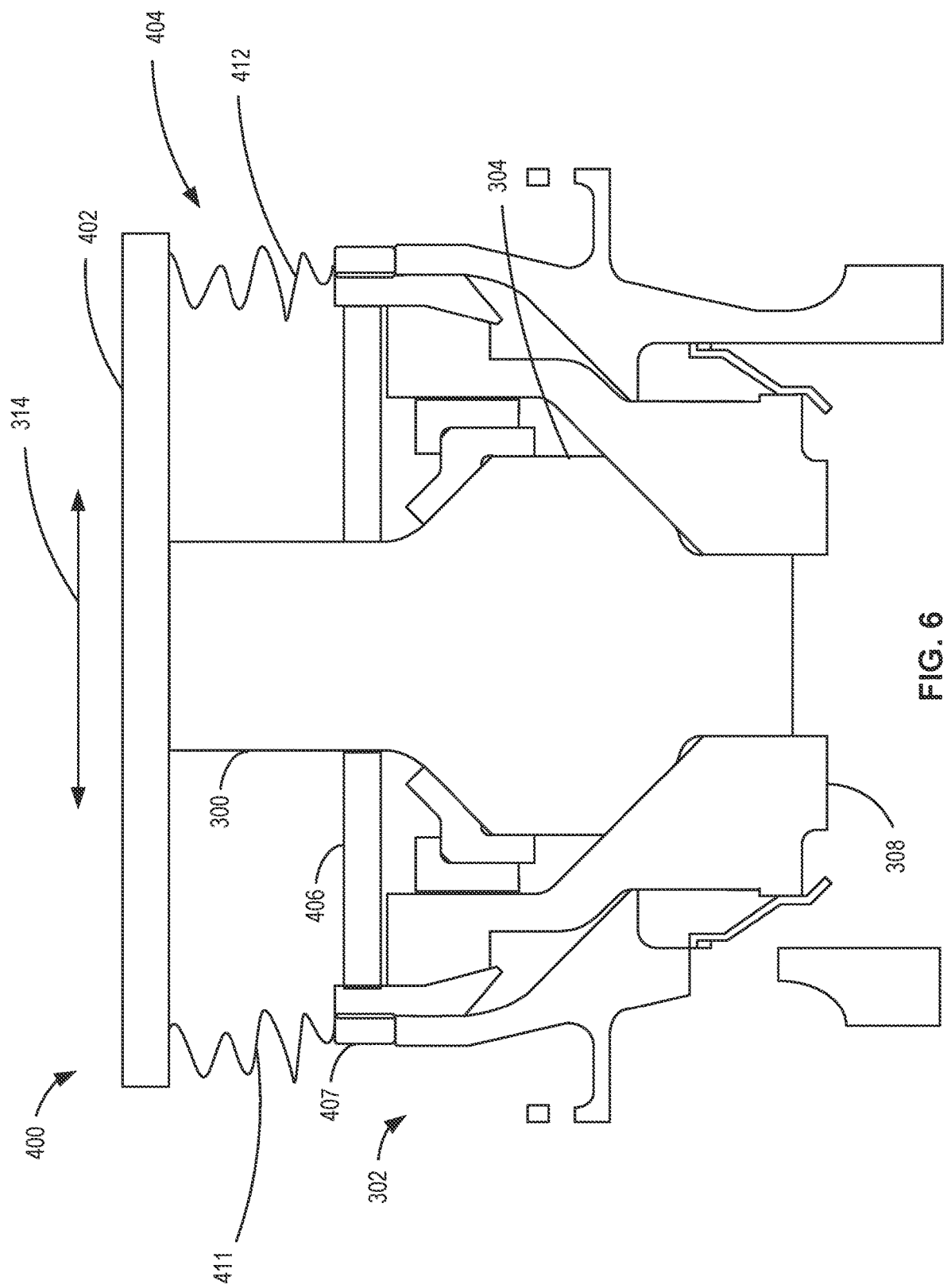
FIG. 6 illustrates a second configuration of the example deflection reduction mechanism of FIG. 4.

FIG. 6 illustrates a second example configuration of the example deflection reduction mechanism 400 of FIG. 4. In the illustrated example of FIG. 6, a diameter of the plate 402 is larger than a diameter of the plate 402 in FIG. 4. In this example, the springs 411, 412 are coupled to the plate 402, and are further coupled to the outer trunnion wall 407 instead of the retention device 406.

Figure 7:
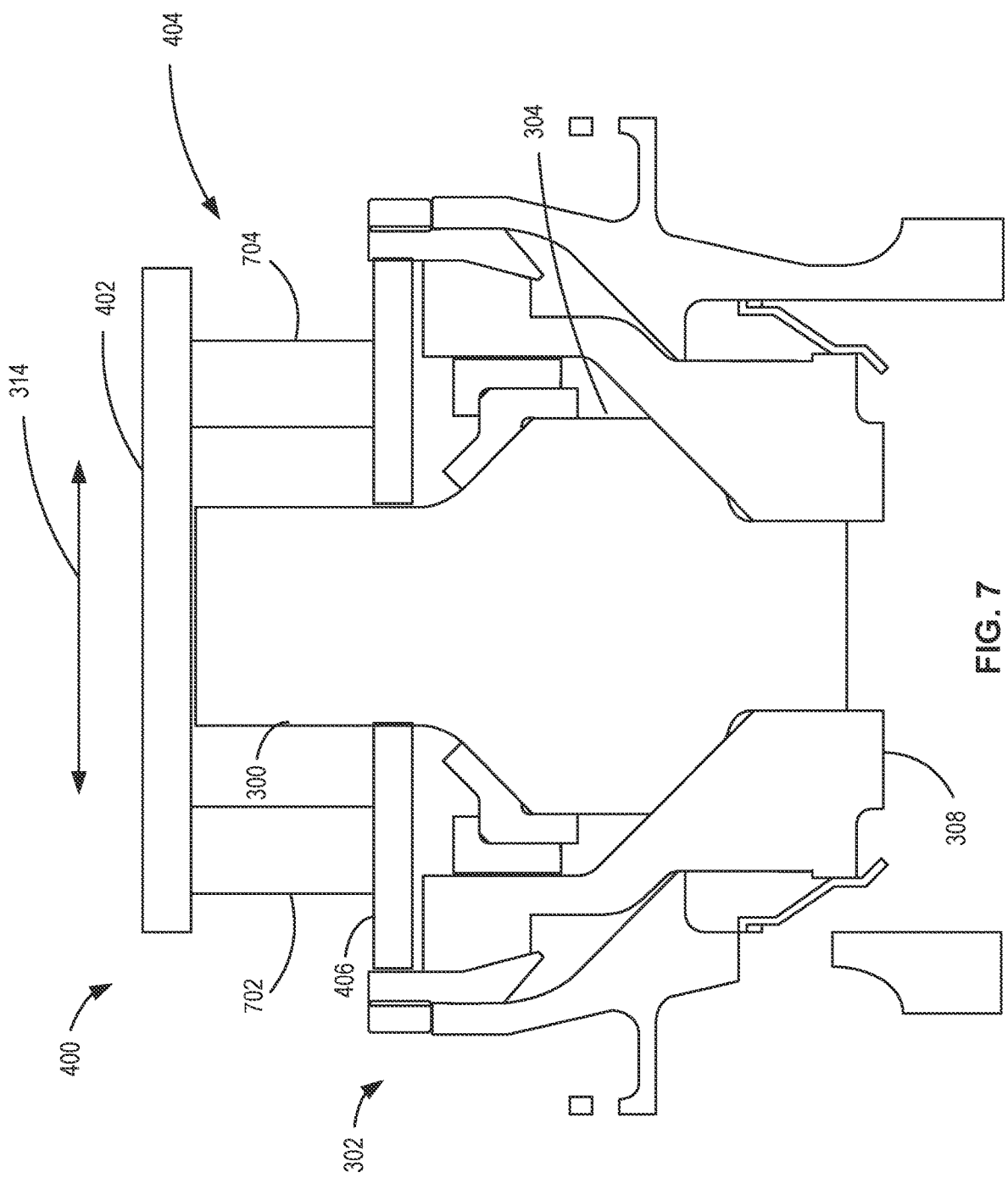
FIG. 7 illustrates a third configuration of the example deflection reduction mechanism of FIGS. 4 and/or 6.

FIG. 7 illustrates a third example configuration of the example deflection reduction mechanism 400 of FIGS. 4 and/or 6. In the illustrated example of FIG. 7, the deflection reduction mechanism 400 includes example feet (e.g., rubber feet, rubber boots) 702, 704 coupled to at least one of the plate 402 or the retention device 406. In this example, the feet 702, 704 are constructed of rubber. In other examples, one or more different materials may be used for the feet 702, 704 instead. In this example, two of the feet 702, 704 are used. However, in other examples, a different number of the feet 702, 704 can be spaced around a circumference of the airfoil 300. In some other examples, a single one of the feet 702, 704 is used, where the one of the feet 702, 704 is a 360-degree ring around the circumference of the airfoil 300. In some examples, the feet 702, 704 are used in addition to or instead of the springs 411, 412 of FIGS. 4 and/or 6 to reduce flexural deflection of the airfoil 300 in the tangential direction 314. In some such examples, the feet 702, 704 are coupled to the plate 402, and the feet 702, 704 contact a surface of the retention device 406, where friction at an interface between the feet 702, 704 and the retention device 406 dissipates the flexural deflection.

Figure 8:
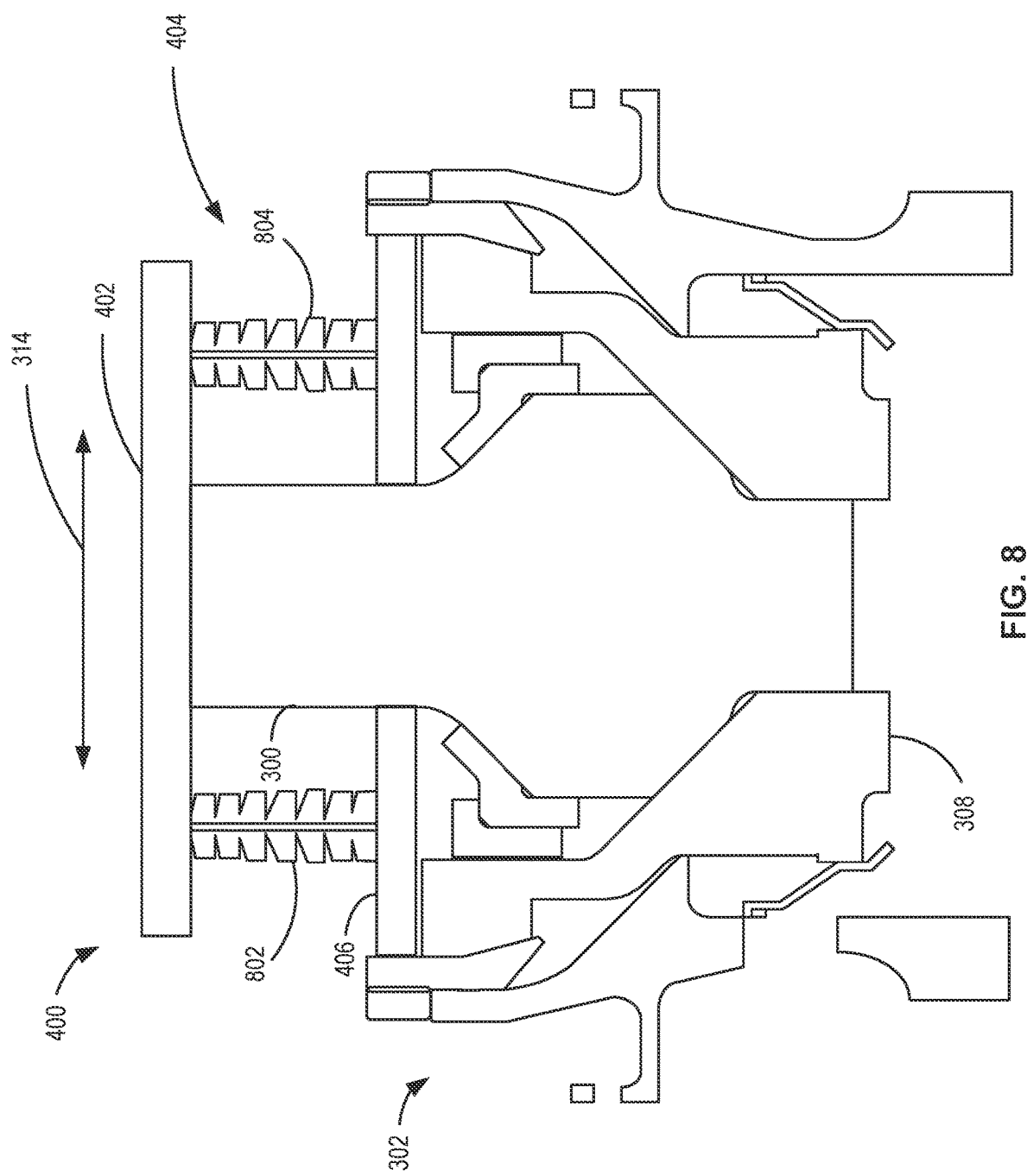
FIG. 8 illustrates a fourth configuration of the example deflection reduction mechanism of FIGS. 4, 6, and/or 7.

FIG. 8 illustrates a fourth example configuration of the example deflection reduction mechanism 400 of FIGS. 4, 6, and/or 7. In the illustrated example of FIG. 8, the damper 404 of the deflection reduction mechanism 400 includes example spring washers 802, 804 coupled between the plate 402 and the retention device 406. In this example, two sets of the spring washers 802, 804 are used. However, in other examples, a different number of sets of the spring washers 802, 804 can be spaced around a circumference of the airfoil 300. In some examples, the spring washers 802, 804 are used in addition to or instead of the springs 411, 412 of FIGS. 4 and/or 6 and/or the feet 702, 704 of FIG. 7.

Figure 9:
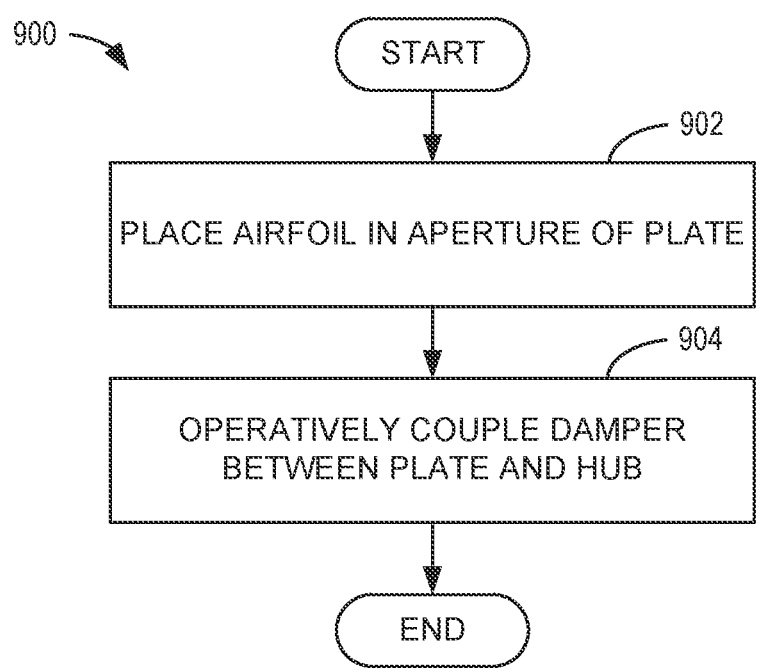
FIG. 9 is a flowchart representative of an example method to produce examples disclosed herein.

FIG. 9 is a flowchart of an example method 900 to produce examples disclosed herein. For example, the method 900 can be used to produce the deflection reduction mechanism 400 of FIGS. 4, 6, 7, and/or 8. The example method 900 begins at block 902, at which the example airfoil 300 of FIGS. 3 and/or 4 is disposed and/or otherwise placed in the aperture 410 of the example plate 402 of FIG. 4.

At block 904, the damper 404 is operatively coupled between the plate 402 and the hub and bearing assembly 302 of FIGS. 3 and/or 4. For example, the damper 404 is coupled to the plate 402 and further coupled to the retention device 406 of the hub and bearing assembly 302. In some examples, the damper 404 includes the springs 411, 412 of FIG. 4, where the springs 411, 412 are welded, brazed, bolted, and/or otherwise retained to at least one of the plate 402 or the hub and bearing assembly 302. In other examples, the damper 404 includes the feet 702, 704 of FIG. 7 and/or the spring washers 802, 804 of FIG. 8.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

From the foregoing, it will be appreciated that example systems, methods, apparatus, and articles of manufacture have been disclosed that reduce deflection of an airfoil during operation of an engine. The disclosed systems, methods, apparatus, and articles of manufacture reduce and/or prevent failure of the airfoil when exposed to vibratory loads, thus reducing part costs, time, and work required to repair and/or replace the airfoil. The disclosed systems, methods, apparatus, and articles of manufacture are accordingly directed to one or more improvement(s) in the operation of a machine and/or mechanical device.

Further aspects of the invention are provided by the subject matter of the following clauses:

An apparatus to reduce deflection of an airfoil, the apparatus including a plate including an aperture, the airfoil disposed in the aperture, and a damper operatively coupled between the plate and a hub of the airfoil, the damper to transform flexural deflection of the airfoil to radial deflection of the plate.

The apparatus of any preceding clause, where the plate is integral to the airfoil.

The apparatus of any preceding clause, where the plate is separate from the airfoil, a gap between the plate and the airfoil in a starting position being less than one millimeter.

The apparatus of any preceding clause, where the damper is coupled to a retention ring of the hub.

The apparatus of any preceding clause, where the damper includes at least one of a spring, a spring washer, or a rubber boot.

The apparatus of any preceding clause, where the damper is spaced about a circumference of a root of the airfoil.

The apparatus of any preceding clause, where the plate is at least one of a first metal or a first composite material, and the airfoil is at least one of a second metal or a second composite material.

An apparatus to reduce deflection of an airfoil, the apparatus of including means for providing an aperture, the airfoil disposed in the aperture, and means for damping operatively coupled between the means for providing the aperture and a hub of the airfoil, the means for damping to transform flexural deflection of the airfoil to radial deflection of the means for providing the aperture.

The apparatus of any preceding clause, where the means for providing the aperture is integral to the airfoil.

The apparatus of any preceding clause, where the means for providing the aperture is separate from the airfoil, a gap between the means for providing the aperture and the airfoil in a starting position being less than one millimeter.

The apparatus of any preceding clause, where the means for damping is coupled to means for retaining the airfoil in the hub.

The apparatus of any preceding clause, where the means for damping includes at least one of a spring, a spring washer, or a rubber boot.

The apparatus of any preceding clause, where the means for damping is spaced about a circumference of a root of the airfoil.

The apparatus of any preceding clause, where the means for providing the aperture is at least one of a first metal or a first composite material, and the airfoil is at least one of a second metal or a second composite material.

A gas turbine including an airfoil, a plate including an aperture, the airfoil disposed in the aperture, and a damper operatively coupled between the plate and a hub of the airfoil, the damper to transform flexural deflection of the airfoil to radial deflection of the plate.

The gas turbine of any preceding clause, where the plate is integral to the airfoil.

The gas turbine of any preceding clause, where the plate is separate from the airfoil, a gap between the plate and the airfoil in a starting position being less than one millimeter.

The gas turbine of any preceding clause, where the damper is coupled to a retention ring of the hub.

The gas turbine of any preceding clause, where the damper includes at least one of a spring, a spring washer, or a rubber boot.

The gas turbine of any preceding clause, where the damper is spaced about a circumference of a root of the airfoil.

A method including placing an airfoil in an aperture of a plate, and coupling a damper between the plate and a hub of the airfoil, the damper to bias the airfoil to a starting position by transforming flexural deflection of the airfoil to radial deflection of the plate.

The method of any preceding clause, and further including welding the plate to the airfoil.

The method of any preceding clause, and further including providing a gap between the plate and the airfoil in the starting position, a width of the gap being less than one millimeter.

The method of any preceding clause, where coupling the damper between the plate and the hub includes coupling the damper to a retention ring of the hub.

The method of any preceding clause, where coupling the damper between the plate and the hub includes coupling at least one of a spring, a spring washer, or a rubber boot between the plate and the hub.

The method of any preceding clause, and further including spacing the damper about a circumference of a root of the airfoil.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to reduce deflection of an airfoil, the apparatus comprising:
    a plate including an aperture, the airfoil disposed in the aperture; and
    a damper operatively coupled between the plate and a hub of the airfoil, the airfoil separate from the hub, the damper to transform flexural deflection of the airfoil to radial deflection of the plate.

2. The apparatus of claim 1, wherein the plate is separate from the airfoil, a gap between the plate and the airfoil in a starting position being less than one millimeter.

3. The apparatus of claim 1, wherein the damper is coupled to a retention ring of the hub.

4. The apparatus of claim 1, wherein the damper includes at least one of a spring, a spring washer, or a rubber boot.

5. The apparatus of claim 1, wherein the damper is spaced about a circumference of a root of the airfoil.

6. The apparatus of claim 1, wherein the plate is at least one of a first metal or a first composite material, and the airfoil is at least one of a second metal or a second composite material.

7. An apparatus to reduce deflection of an airfoil, the apparatus comprising:
    means for providing an aperture, the airfoil disposed in the aperture; and
    means for damping operatively coupled between the means for providing the aperture and a hub of the airfoil, the airfoil separate from the hub, the means for damping to transform flexural deflection of the airfoil to radial deflection of the means for providing the aperture.

8. The apparatus of claim 7, wherein the means for providing the aperture is separate from the airfoil, a gap between the means for providing the aperture and the airfoil in a starting position being less than one millimeter.

9. The apparatus of claim 7, wherein the means for damping is coupled to means for retaining the airfoil in the hub.

10. The apparatus of claim 7, wherein the means for damping includes at least one of a spring, a spring washer, or a rubber boot.

11. The apparatus of claim 7, wherein the means for damping is spaced about a circumference of a root of the airfoil.

12. The apparatus of claim 7, wherein the means for providing the aperture is at least one of a first metal or a first composite material, and the airfoil is at least one of a second metal or a second composite material.

13. A gas turbine comprising:
    an airfoil;
    a plate including an aperture, the airfoil disposed in the aperture; and
    a damper operatively coupled between the plate and a hub of the airfoil, the airfoil separate from the hub, the damper to transform flexural deflection of the airfoil to radial deflection of the plate.

14. The gas turbine of claim 13, wherein the plate is separate from the airfoil, a gap between the plate and the airfoil in a starting position being less than one millimeter.

15. The gas turbine of claim 13, wherein the damper is coupled to a retention ring of the hub.

16. The gas turbine of claim 13, wherein the damper includes at least one of a spring, a spring washer, or a rubber boot.

17. The gas turbine of claim 13, wherein the damper is spaced about a circumference of a root of the airfoil.

* * * * *